(12) United States Patent
Mealy et al.

(10) Patent No.: US 8,614,832 B2
(45) Date of Patent: Dec. 24, 2013

(54) DYNAMIC IMAGE DITHERING

(71) Applicant: Marvell World Trade Ltd., St. Michael (BB)

(72) Inventors: James Mealy, Corvallis, OR (US); Asher Simmons, Corvallis, OR (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/722,295

(22) Filed: Dec. 20, 2012

(65) Prior Publication Data
US 2013/0107325 A1 May 2, 2013

Related U.S. Application Data

(63) Continuation of application No. 12/041,535, filed on Mar. 3, 2008, now Pat. No. 8,339,675.

(60) Provisional application No. 60/892,718, filed on Mar. 2, 2007.

(51) Int. Cl.
G06K 15/00 (2006.01)
H04N 1/405 (2006.01)

(52) U.S. Cl.
USPC .......... 358/3.13; 358/1.12; 358/3.14; 347/15; 347/19

(58) Field of Classification Search
USPC ................. 358/3.13, 1.12, 3.14; 347/19, 15
See application file for complete search history.

(56) References Cited

U.S. PATENT DOCUMENTS

| 5,578,813 | A | 11/1996 | Allen et al. |
| 5,887,223 | A | 3/1999 | Sakai et al. |
| 5,927,872 | A | 7/1999 | Yamada |
| 2001/0013939 | A1 | 8/2001 | Weaver et al. |
| 2006/0044583 | A1 | 3/2006 | Ishijima et al. |
| 2006/0152766 | A1* | 7/2006 | Saquib .......................... 358/3.13 |
| 2006/0279784 | A1 | 12/2006 | Carlson et al. |
| 2007/0070423 | A1 | 3/2007 | Kakutani |
| 2007/0159654 | A1 | 7/2007 | Kambegawa et al. |
| 2008/0212118 | A1 | 9/2008 | Mealy et al. |
| 2008/0212120 | A1* | 9/2008 | Mealy et al. ................. 358/1.12 |
| 2009/0225336 | A1 | 9/2009 | Siemens et al. |

FOREIGN PATENT DOCUMENTS

| EP | 0606132 A | 7/1994 |
| EP | 1152597 | 11/2001 |
| JP | 200211914 | 1/2002 |

(Continued)

OTHER PUBLICATIONS

U.S. Appl. No. 11/955,209, filed Dec. 12, 2007, Bledsoe, et al "Printing on Planar or Non-Planar Print Survace with Handhel Printing Device", 51 pages.

(Continued)

Primary Examiner — Twyler Haskins
Assistant Examiner — Michael Burleson

(57) ABSTRACT

Systems, apparatuses, and methods for dynamic image dithering for a printing device are described herein. Embodiments may include an image processing module to process a source image file to provide a dithered image file with print data for each of a plurality of image locations. Printing substance may be deposited and the image processing module may provide the dithered image file with additional print data based at least in part on the deposited printing substance. Other embodiments may be described and claimed.

18 Claims, 6 Drawing Sheets

(56) References Cited

FOREIGN PATENT DOCUMENTS

| JP | 2006527355 A | 11/2006 |
|---|---|---|
| JP | 2006341604 A | 12/2006 |
| WO | WO2004-088576 | 10/2004 |

OTHER PUBLICATIONS

U.S. Appl. No. 11/955,228, filed Dec. 12, 2007, Bledsoe et al., "Scanner for a Mobile Device", 34 pages.

U.S. Appl. No. 11/955,240, filed Dec. 12, 2007, Bledsoe et al., "Image Translation Device for a Mobile Device," 42 pages.

U.S. Appl. No. 11/955,258, filed Dec. 12, 2007, Simmons, et al., "Printer for a Mobile Device," 37 pages.

U.S. Appl. No. 11/959,027, filed Dec. 18, 2007, Simmons et al., "Ergonomic Design for a Handheld Image Translation Device," 25 pages.

U.S. Appl. No. 11/968,528, filed Jan. 2, 2008, Simmons et al., "Determining End of Print Job in Handheld Image Translation Device," 45 pages.

U.S. Appl. No. 11/972,462, filed Jan. 10, 2008, Simmons et al., "Usage Maps in Image Deposition Devices," 39 pages.

U.S. Appl. No. 12/013,313, filed Jan. 11, 2008, Bledsoe et al., "Adaptive Filtering Scheme in Handheld Positioning Device," 38 pages.

U.S. Appl. No. 12/016,833, filed Jan. 18, 2008, Simmons et al., "Sensor Positioning in Handheld Image Translation Device," 39 pages.

U.S. Appl. No. 12/036,996, filed Feb. 25, 2008, Bledsoe et al., "Determining Positioning of a Handheld Image Translation Device," 41 pages.

U.S. Appl. No. 12/037,029, filed Feb. 25, 2008, Bledsoe et al., "Definition of Print Image for Image Translation Device," 36 pages.

U.S. Appl. No. 12/037,043, filed Feb. 25, 2008, Bledsoe et al., "Bit Selection from Print in Image Transalation Device," 43 pages.

U.S. Appl. No. 12/038,660, filed Feb. 27, 2008, McKinley et al., "Providing User Feedback in Handheld Device," 40 pages.

U.S. Appl. No. 12/041,496, filed Mar. 3, 2008, Mealy, "Handheld Image Translation Device," 40 pages.

U.S. Appl. No. 12/041,515, filed Mar. 3, 2008, Mealy et al., "Position Correction in Handheld Translation Device," 42 pages.

U.S. Appl. No. 12/041,535, filed Mar. 3, 2008, Mealy et al., "Dynamic Image Dithering," 34 pages.

U.S. Appl. No. 12/062,472, filed Apr. 3, 2008, McKinley et al., "Image Translation Device Providing Navigational Data Feedback to communication Device," 39 pages.

U.S. Appl. No. 12/188,056, filed Aug. 7, 2008, Mealy et al., "Controlling a Plurality of Nozzles of a Handheld Printer," 47 pages.

* cited by examiner

DYNAMIC IMAGE DITHERING

CROSS-REFERENCES TO RELATED APPLICATIONS

The present disclosure is a continuation of and claims priority to U.S. patent application Ser. No. 12/041,535, filed Mar. 3, 2008, now U.S. Pat. No. 8,339,675, issued Dec. 25, 2012, which claims priority to U.S. Provisional Application No. 60/892,718, filed on Mar. 2, 2007, which are incorporated herein by reference.

TECHNICAL FIELD

Embodiments of the present invention relate to the field of printing and, in particular, to dynamic image dithering for printing devices.

BACKGROUND

Most printing processes cannot directly vary the density of a printing substance, or pigment, that is deposited on a print medium. Instead, they vary the density of the image by restricting the area of the pigment on the print medium. In this way, the native color of the print media and the pigment combine to produce the desired density. To be effective, the scale of this pattern of pigmented and non-pigmented medium must be small enough such that the observer does not see the pattern and instead integrates the pattern into an image that has variable density. This process is called screening or dithering.

Digital printing systems typically use dithering to produce images with variable density. Before the image is printed, a source image is converted to a dithered image. Because the source image has variable density, each pixel of the source image can take on many values, typically represented by a two-dimensional array of eight- or ten-bit values per image component. In the case of a color image, there may be four image components: cyan, magenta, yellow, and black (CMYK).

Dithering reduces the image to pixel values with two values, on or off. To retain the original resolution of the source image a dithered image may distribute the pigment dots over a finer grid than the original resolution of the source image. In the simplest case, if the source image has a range of X density values, then the resolution of the dithered image may be X times the resolution of the source image. Depending on how the pigmentation process interacts with the print medium, this expansion can be less than X times the source image resolution.

Currently, dithering is done with the knowledge that the process of printing will naturally orient the rectilinear print path to the grid of the source image. Furthermore, current dithering operations are based on an expectation that the printing process will cause the dither dots to be selected from the image in a stereotyped pattern that will ensure all the dither dots will be printed in a predictable time.

SUMMARY

There is provided, in accordance with various embodiments of the present invention, a control block of a printing device that includes an image processing module configured to process a source image file to provide a dithered image file having print data for each of a plurality of image locations; a print module configured to cause a printing substance to be deposited on one or more locations of a medium based at least in part on the print data of one or more image locations of the plurality of image locations; and the image processing module being further configured to further process the source image file to provide the dithered image file with additional print data based at least in part on the deposited printing substance.

In some embodiments, the additional print data includes print data for each of another plurality of image locations and/or updated print data for at least some of the plurality of image locations.

In some embodiments, the control block further includes an optical imaging module configured to control one or more optical imaging sensors to capture surface images of the one or more locations of the medium; and the image processing module being further configured to further process the source image file to provide the dithered image file with additional print data based at least in part on the captured surface images.

In some embodiments, the print module is further configured to provide a history of deposited printing substance and the image processing module is further configured to further process the source image file to provide the dithered image file with additional print data based at least in part on the history.

The control block may be configured to be hosted by a handheld printing device.

In some embodiments, a method of controlling a printing device is disclosed. The method may include processing a source image file to provide a dithered image file having print data for each of a plurality of image locations; receiving feedback data on deposition of a printing substance at one or more locations of a medium, the printing substance being deposited based at least in part on the print data for one or more image locations of the plurality of image locations; and further processing the source image file to provide the dithered image file with additional print data based at least in part on the feedback data.

In some embodiments, the additional print data includes print data for each of another plurality of image locations and/or updated print data for at least some of the plurality of image locations.

In some embodiments, the method further includes depositing the printing substance at the one or more locations of the medium.

In some embodiments, the method further includes recording a history of deposited printing substance; and providing the feedback data based at least in part on the history.

In some embodiments, the method further includes capturing surface images of the one or more locations of the medium; and providing the feedback data based at least in part on the captured surface images.

In some embodiments, a printing device is disclosed. The printing device may include a print head; and a control block having an image processing module configured to process a source image file to provide a dithered image file having print data for each of a plurality of image locations; a print module configured to control the print head to deposit a printing substance on one or more locations of a medium based at least in part on the print data of one or more image locations of the plurality of image locations; and the image processing module being further configured to further process the source image file to provide the dithered image file with additional print data based at least in part on the deposited printing substance.

In some embodiments, the printing device may include one or more optical imaging sensors; an optical imaging module, of the control block, configured to control the one or more optical imaging sensors to capture surface images of the one or more locations of the medium; and the image processing module being further configured to further process the source image file to provide the dithered image file with the additional print data based at least in part on the captured surface images.

In some embodiments, the printing device may include one or more navigation sensors; and a position module, of the control block, configured to control the one or more navigation sensors to capture navigational measurements to facilitate a determination of a position of the print head relative to a reference location.

The print module may be further configured to provide a history of deposited printing substance and the image processing module is further configured to further process the source image file to provide the dithered image file with the additional print data based at least in part on the history.

The additional print data may include print data for each of another plurality of image locations and/or updated print data for at least some of the plurality of image locations.

In some embodiments a device, which may be a printing device or components thereof, is disclosed. The device may include means for processing a source image file to provide a dithered image file having print data for each of a plurality of image locations; means for receiving feedback data on deposition of a printing substance at one or more locations of a medium, the printing substance being deposited based at least in part on the print data for one or more image locations of the plurality of image locations; and means for further processing the source image file to provide the dithered image file with additional print data based at least in part on the feedback data.

In some embodiments, the device may include means for depositing the printing substance at the one or more locations of the medium.

In some embodiments, the device may include means for recording a history of deposited printing substance; and means for providing the feedback data based at least in part on the history.

In some embodiments, a machine-accessible medium is disclosed. The machine-accessible medium may have associated instructions, which, when executed results in a printing device processing a source image file to provide a dithered image file having print data for each of a plurality of image locations; receiving feedback data on deposition of a printing substance at one or more locations of a medium, the printing substance being deposited based at least in part on the print data for one or more image locations of the plurality of image locations; and further processing the source image file to provide the dithered image file with additional print data based at least in part on the feedback data. The additional print data may include print data for each of another plurality of image locations and/or updated print data for at least some of the plurality of image locations.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Figure 1:
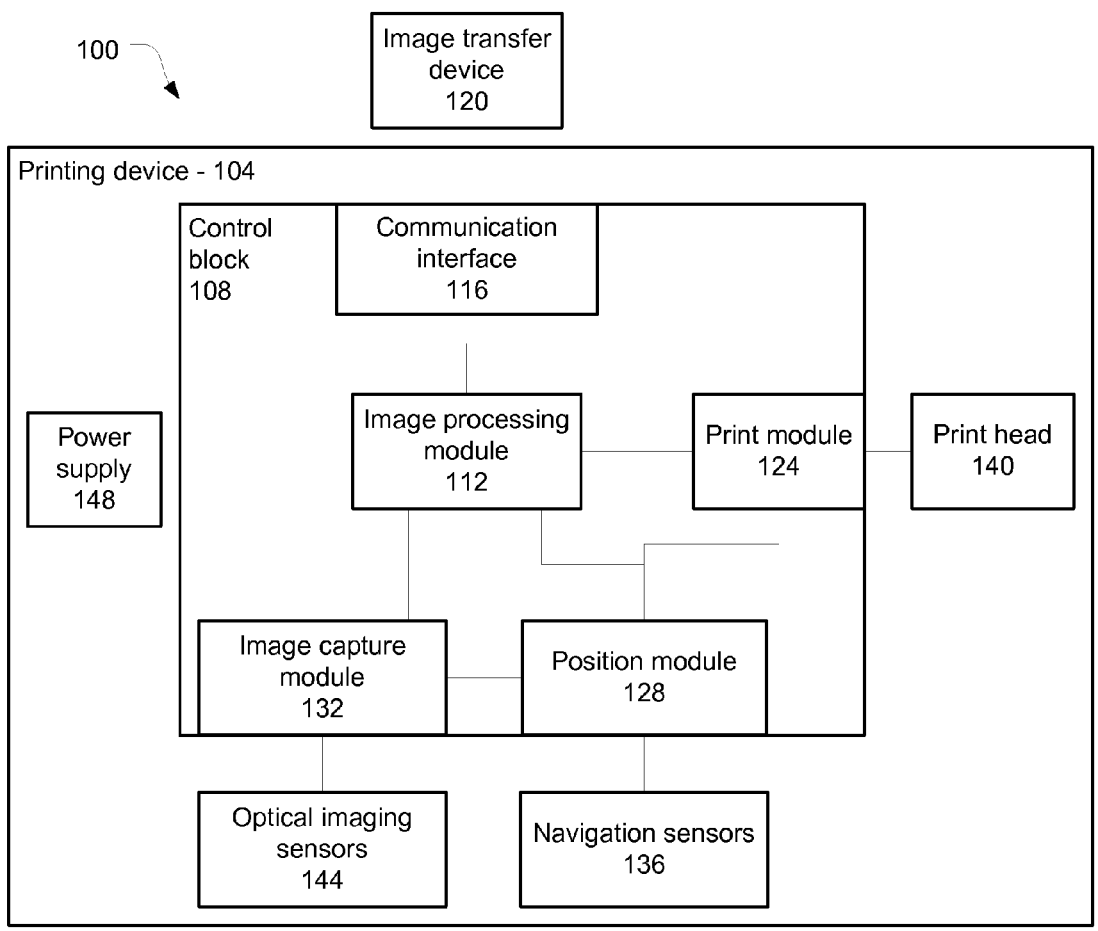
FIG. 1 is a schematic of a system including a printing device in accordance with various embodiments of the present invention.

FIG. 1 is a schematic of a system 100 including a printing device 104 in accordance with various embodiments of the present invention. The printing device 104 may include a control block 108 configured to control printing operations as will be described herein. In some embodiments, the printing device 104 may be a handheld printing device with the control block 108, and an image processing module 112, in particular, processing an image in a manner specifically configured to account for characteristics attributable to the printing device 104 being manually manipulated throughout the printing process. In some embodiments, these characteristics may include imprecise positioning of the printing device 104 (e.g., as a result of accumulated positioning error) and/or relatively unpredictable movement. As will be described in further detail herein, the image processing module 112 may dynamically dither an image during a printing operation to account for these characteristics.

The control block 108 may include a communication interface 116 configured to communicatively couple the control block 108 to an image transfer device 120. The image transfer device 120 may be any type of device capable of transmitting data related to an image to be printed. The image transfer device 120 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data.

The communication interface 116 may include a wireless transceiver to allow the communicative coupling with the image transfer device 120 to take place over a wireless link. The image data may be wirelessly transmitted over the link through the modulation of electromagnetic waves with frequencies in the radio, infrared or microwave spectrums.

A wireless link may contribute to the mobility and versatility of the printing device 104. However, some embodiments may additionally/alternatively include a wired link communicatively coupling the image transfer device 120 to the communication interface 116.

In some embodiments, the communication interface 116 may communicate with the image transfer device 120 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

The communication interface 116 may transmit the received image data to the image processing module 112. In some embodiments, the received image data may represent a source image file. In other embodiments, the image processing module 112 may generate the source image file based on the received image data. The image processing module 112 may then generate at least a portion of dithered image file based on the source image file. This dithered image file may be dynamically updated throughout the printing operation as will be described in more detail in FIGS. 2-6.

The control block 108 may also include a print module 124, a position module 128, and an image capture module 132 coupled to each other and to the image processing module 112 at least as shown. Briefly, the position module 128 may control one or more navigation sensors 136 in a manner to capture navigational measurements. Positioning information, based on these navigational measurements, may be provided to the print module 124 and may be used to determine a position of a print head 140 relative to a reference location. Positioning information may also be provided to the image processing module 112 to facilitate dynamic dithering.

In some embodiments, the navigational measurements may be navigational images of the print medium. In these embodiments, the navigation sensors 136 may be referred to as imaging navigation sensors. An imaging navigation sensor may include a light source, e.g., LED, a laser, etc., and an optoelectronic sensor designed to capture a series of navigational images of the adjacent print medium as the printing device 104 is moved over the print medium.

The position module 128 may process the navigational images to detect structural variations of the print medium. The movement of the structural variations in successive images may indicate motion of the printing device 104 relative to the medium. Tracking this relative movement may facilitate determination of the precise positioning of the navigation sensors 136. The navigation sensors 136 may be maintained in a structurally rigid relationship with the print head 140, thereby allowing for the calculation of the precise location of the print head 140.

In other embodiments, non-imaging navigation sensors, e.g., an accelerometer, a gyroscope, a pressure sensor, etc., may be additionally/alternatively used to capture navigational measurements.

The navigation sensors 136 may have operating characteristics sufficient to track movement of the printing device 104 with the desired degree of precision. In one example, imaging navigation sensors may process approximately 2000 frames per second, with each frame including a rectangular array of 30×30 pixels. Each pixel may detect a six-bit grayscale value, e.g., capable of sensing 64 different levels of patterning.

Once the print module 124 receives the positioning information it may coordinate the location of the print head 140 to a portion of the dithered image with a corresponding location. The print module 124 may then control the print head 140 in a manner to deposit a printing substance, e.g., pigment, on the print medium to represent the corresponding portion of the dithered image.

The print head 140 may be an inkjet print head having a plurality of nozzles designed to deposit the printing substance as liquid ink droplets. The ink, which may be contained in reservoirs/cartridges, may be black and/or any of a number of various colors. A common, full-color inkjet print head may have nozzles for cyan, magenta, yellow, and black ink. While many embodiments described herein may discuss ink as the printing substance, other embodiments may utilize other printing techniques, e.g., toner-based printers such as laser or light-emitting diode (LED) printers, solid ink printers, dye-sublimation printers, inkless printers, etc.

The image capture module 132 may be communicatively coupled to one or more optical imaging sensors 144. The optical imaging sensors 144 may include a number of individual sensor elements. The optical imaging sensors 144 may be designed to capture a plurality of surface images of the print medium, which may be individually referred to as component surface images. In various embodiments, the component surface images may be used for determining the locations of the deposited printing substance, for calibrating the position module 128 (e.g., to correct for accumulated error), and/or for generating a composite image by stitching together the component surface images (e.g., when the printing device 104 is a multifunction device capable of scanning images).

The printing device 104 may include a power supply 148 coupled to various components of the printing device 104. The power supply 148 may be a mobile power supply, e.g., a battery, a rechargeable battery, a solar power source, etc. In other embodiments the power supply 148 may additionally/alternatively regulate power provided by another component (e.g., the image transfer device 120, a power cord coupled to an alternating current (AC) outlet, etc.).

Figure 2:
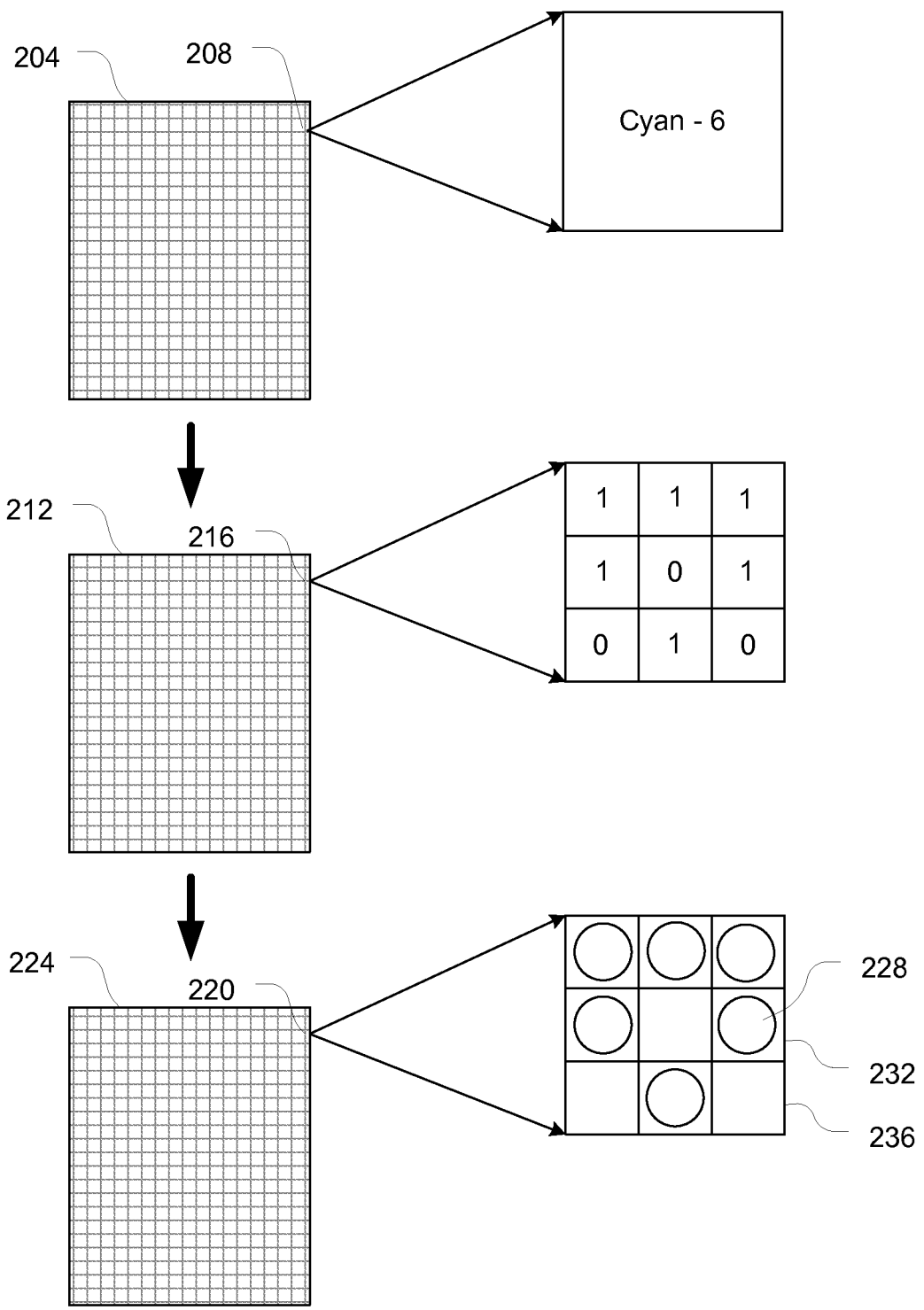
FIG. 2 is a graphical representation of an image in various forms in accordance with various embodiments of the present invention.

FIG. 2 is a graphical representation of an image in various forms in accordance with various embodiments of the present invention. A source image file 204 may provide an intensity value for each location, or pixel, of the source image file. The source image file 204 may include the information for one particular image component, e.g., cyan, while other source image files may provide information for the other image components. In another embodiment, the source image file 204 may provide information for each of the image components.

For simplicity, consider an embodiment in which the source image file 204 provides for a range of eight intensities, e.g., 0-7, at each location. These eight intensities may be represented by a three-bit value. In many embodiments, the source image file 204 may provide for a greater range of intensities by providing, e.g., an eight- or ten-bit value.

In the embodiment illustrated, a location 208 may include an intensity value of six for cyan (which may be represented by a three-bit value of "110"). For the purposes of explanation, this may mean that six dots of cyan printing substance should be deposited at a location on a print medium corresponding to the location 208.

The image processing module 112 may generate a dithered image file 212 based on the source image file 204, which may have been received either directly from the image transfer device 120 or generated by the image processing module 112 based on image data received from the image transfer device 120. The dithered image file 212 may include locations that correspond to locations of the source image file 204. In the embodiment illustrated, location 216 of the dithered image file 212 may correspond to location 208 of the source image file 204.

The dithered image file 212 may include print data that arranges the six dots of printing substance within location 216 in a manner to produce a desired optical effect based on the combination of the native color of a print medium and the ink. The print data may have an on/off value (e.g., represented by a one-bit value) for each of a number of positions within the location 216. These on/off values may be the basis of controlling a nozzle of the print head 140 to deposit or not deposit the printing substance when the nozzle is determined to be over a physical location 220 (corresponding to locations 208 and 216) of a print medium 224. Magnified physical location 220 of FIG. 2 depicts a scenario in which all of the dots have been deposited according to the print data of the location 216.

In some embodiments, only some of the locations/positions of the dithered image file 212 may be initially populated with print data, with the remaining locations/positions being populated after a printing operation has been initiated. In particular, the remaining locations/positions may be populated based at least in part on deposited printing substance.

In other embodiments, all of the locations/positions of the dithered image file 212 may be initially populated with print data, with the print data in at least some of the populated locations/positions being updated based at least in part on the deposited printing substance.

Figure 3:
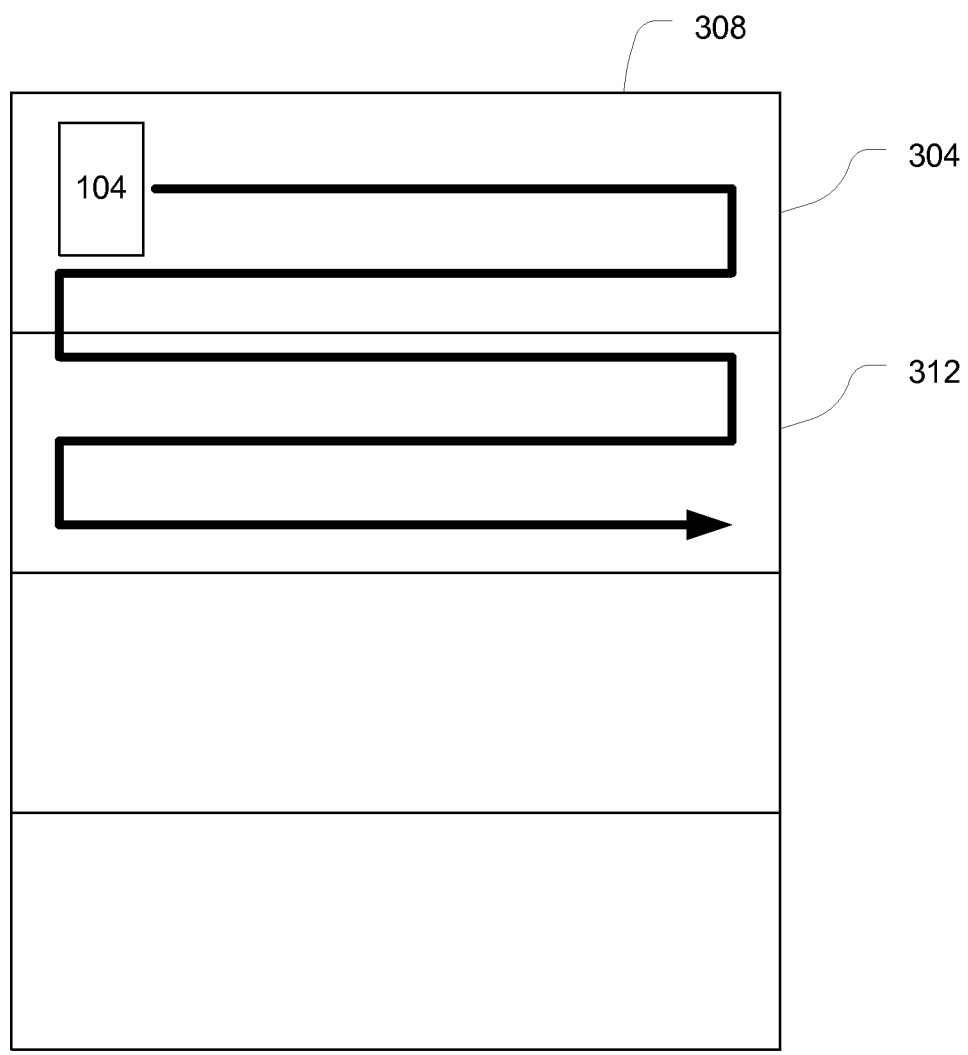
FIG. 3 is graphical representation of a printing operation and associated dynamic dithering operation in accordance with various embodiments of the present invention.

FIG. 3 is graphical representation of a printing operation and associated dynamic dithering operation in accordance with various embodiments of the present invention. In this embodiment, the image processing module 112 may initially provide a dithered image file with print data corresponding to a first portion 304 of a print medium 308. As the printing device 104 is moved over at least part of the first portion 304, it may deposit the printing substance according to the print data. A record of the deposited printing substance may be generated and analyzed to facilitate generation of other print data for the dithered image file.

For example, in an embodiment, by effect of an accumulated positioning error, the deposited printing substance within the first portion 304 may be vertically compressed. This compression may be determined through analysis of the deposited printing substance. In this embodiment, the image processing module 112 may generate print data within the dithered image file corresponding to a second portion 312 of the print medium 308 in a manner to advantageously transition between the first portion 304 and a second portion 312. In such a manner, dynamic dithering may prevent (or lessen) the occurrence of visual artifacts in the printed image.

With some embodiments, the printing device 104 may be moved over the print medium at a rate that prevents all of the printing substance to be deposited. This may occur in areas of the print medium that have high densities of printing substances due to, e.g., dry time of the printing substances. With such embodiments, the print data of the dithered image file that corresponds to undeposited printing substance may be updated based on the deposited printing substance. Thus, when the printing device 104 retraces areas that have at least some deposited printing substance, the printing device 104 may fill in the density of the image in a desired manner, e.g., a manner that reduces the occurrence of visual artifacts.

In some embodiments, the dynamic dithering may be based at least in part on placement/orientation of the nozzles of the print head 140. For example, referring again to FIG. 2, it may be that printing substance 228, which is shown in position 232, may alternatively be placed in position 236 with little or no adverse effect on the image. If, in the process of a printing operation, the image processing module 112 determines that a nozzle is likely to pass over position 236 but not position 232, the print data of location 216 may be adjusted to increase the likelihood that the printing substance 228 gets deposited.

While the embodiment illustrated in FIG. 3 illustrates the first portion 304 as being a horizontal swath of the print medium 308, other embodiments may initially provide print data corresponding to a portion of the print medium 308 of other dimensions.

Figure 4:
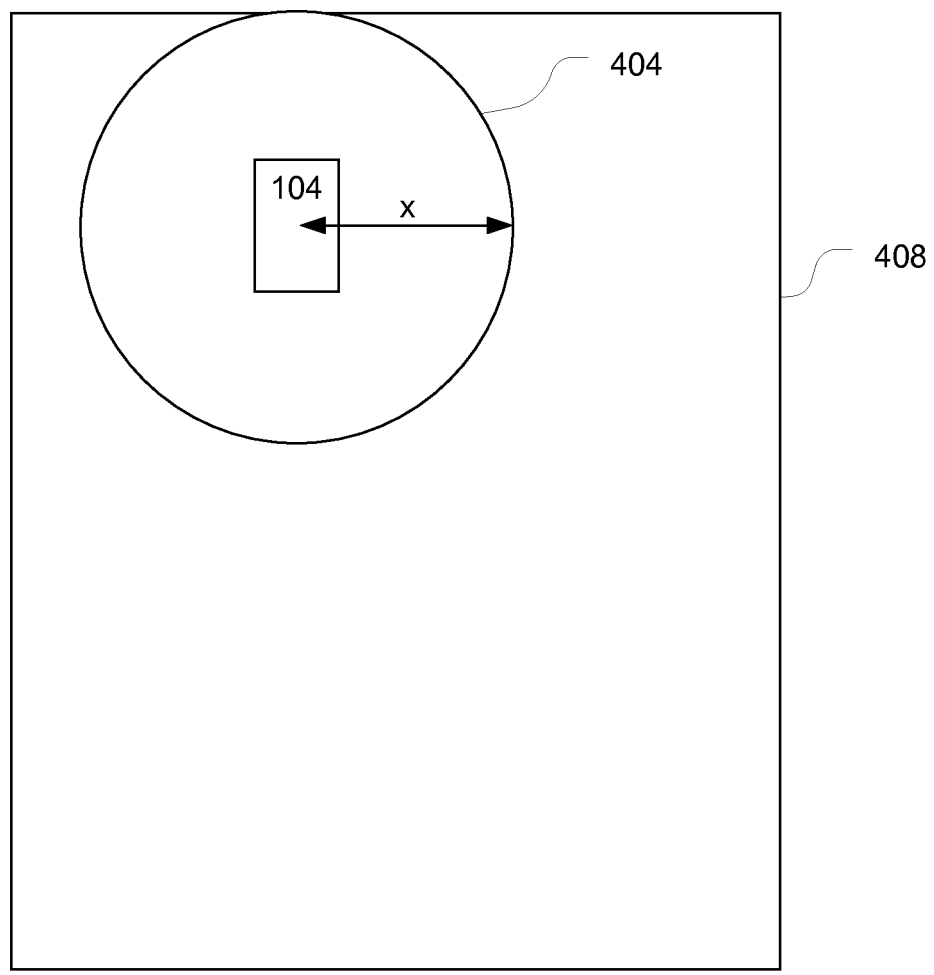
FIG. 4 is another graphical representation of a printing operation and associated dynamic dithering operation in accordance with various embodiments of the present invention.

FIG. 4 is another graphical representation of a printing operation and associated dynamic dithering operation in accordance with various embodiments of the present invention. In this embodiment, the image processing module 112 may provide print data in the dithered image file corresponding to a portion 404 of the print medium 408. The portion 404 may be dynamically defined with respect to the position of the printing device 104. As shown, it may be defined as a circle centered at the printing device 104 with a radius x. In this manner, print data may be provided for the immediate vicinity of the printing device 104 allowing the print module 124 to access the print data when desired.

The image processing module 112 may not provide print data for areas outside of the portion 404, but will, instead, accumulate the history of deposited printing substance and utilize this history to dynamically provide the print data for areas within the portion 404 as the printing device 104 is moved over the print medium 408.

In some embodiments, the portion 404 may change based at least in part on detected motion. For example, the portion 404 may be elongated in the direction that the printing device 104 is moving, which may be determined through the positioning operations of the position module 128, and contracted in the opposite direction.

Figure 5:
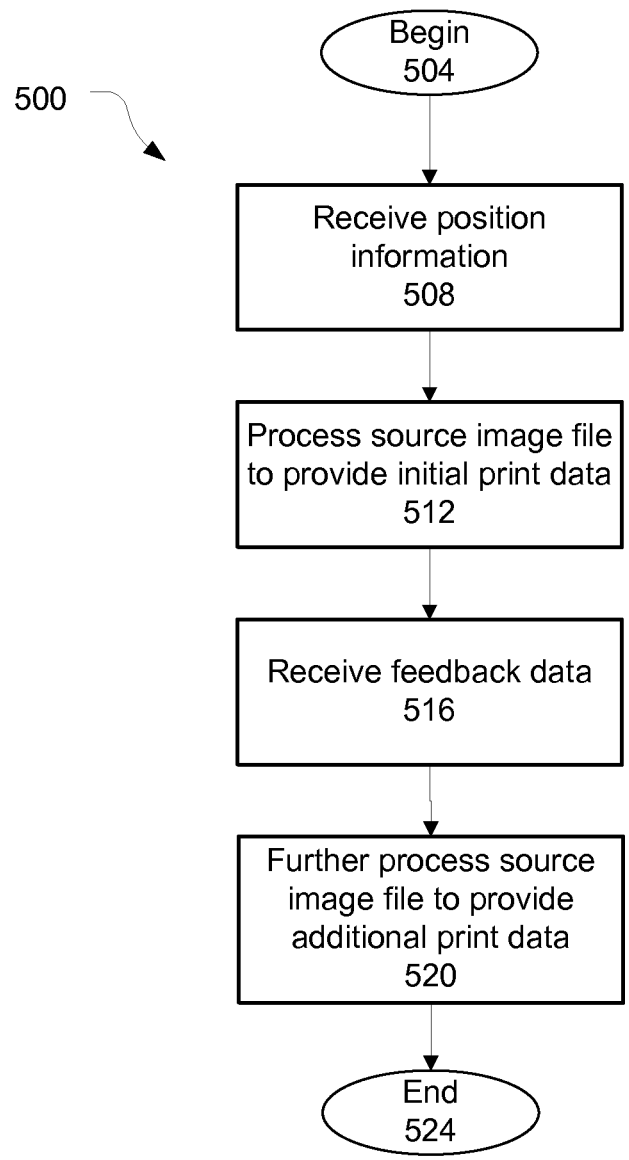
FIG. 5 is a flow diagram depicting a dynamic dithering operation of the image processing module in accordance with various embodiments of the present invention.

FIG. 5 is a flow diagram 500 depicting a dynamic dithering operation of the image processing module 112 in accordance with various embodiments of the present invention. The dynamic dithering operation may take place contemporaneously with a printing operation of the printing device 104.

A dynamic dithering operation may begin in block 504 with an initiation of a printing operation. The image processing module 112 may receive position information at block 508 from position module 128.

At block 512, the image processing module 112 may process a source image file to provide initial print data for a dithered image file. The initial print data may correspond to a subset of the total source image file or to the entire source image file. In some embodiments, if the initial print data corresponds to a subset of the source image file, the subset may be defined at least in part on the position information received at block 508, e.g., to establish print data for areas within an immediate vicinity to the printing device 104.

At block 516, the image processing module 112 may receive feedback data related to printing substance deposited in the contemporaneous printing operation. The image processing module 112 may receive this feedback data from the image capture module 132 (as a result of captured component surface images providing details on deposited printing substance) and/or the print module 124 (as a result of recorded history of deposited printing substance).

At block 520, the image processing module 112 may further process the source file to provide additional print data for the dithered image file. As discussed above, this additional print data may be print data that was not previously provided and/or it may be in the form of an update to previously provided print data.

The dynamic dithering operation may end at block 524, which may be tied to an end of the contemporaneous printing operation.

Figure 6:
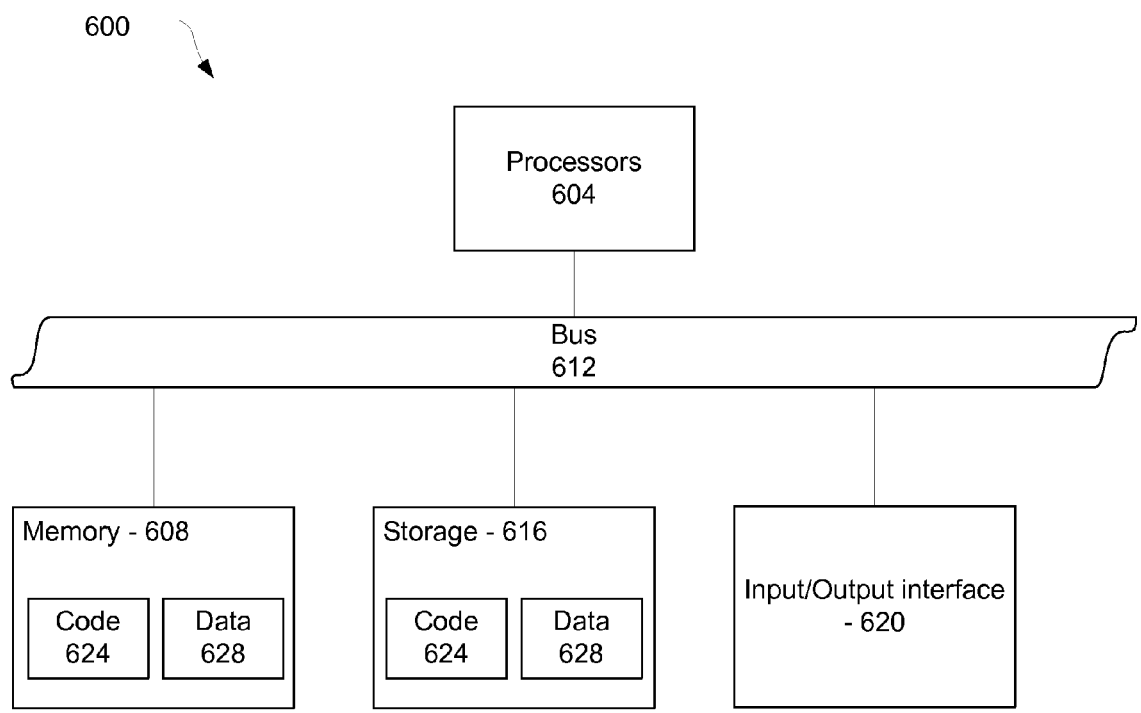
FIG. 6 illustrates a computing device capable of implementing a control block of a printing device in accordance with various embodiments of the present invention.

FIG. 6 illustrates a computing device 600 capable of implementing a control block, e.g., control block 108, in accordance with various embodiments. As illustrated, for the embodiments, computing device 600 includes one or more processors 604, memory 608, and bus 612, coupled to each other as shown. Additionally, computing device 600 includes storage 616, and one or more input/output interfaces 620 coupled to each other, and the earlier described elements as shown. The components of the computing device 600 may be designed to provide the printing, positioning, and/or dynamic dithering operations of a control block of a printing device as described herein.

Memory 608 and storage 616 may include, in particular, temporal and persistent copies of code 624 and data 628, respectively. The code 624 may include instructions that when accessed by the processors 604 result in the computing device 600 performing operations as described in conjunction with various modules of the control block in accordance with embodiments of this invention. The processing data 628 may include data to be acted upon by the instructions of the code 624, e.g., the source file image, the dithered file image, etc. In particular, the accessing of the code 624 and data 628 by the processors 604 may facilitate the various operations as described herein.

The processors 604 may include one or more single-core processors, multiple-core processors, controllers, application-specific integrated circuits (ASICs), etc.

The memory 608 may include various levels of cache memory and/or main memory and may be random access memory (RAM), dynamic RAM (DRAM), static RAM (SRAM), synchronous DRAM (SDRAM), dual-data rate RAM (DDRRAM), etc.

The storage 616 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 616 may be a storage resource physically part of the computing device 600 or it may be accessible by, but not necessarily a part of, the computing device 600. For example, the storage 616 may be accessed by the computing device 600 over a network.

The I/O interfaces 620 may include interfaces designed to communicate with peripheral hardware, e.g., print head 140, navigation sensors 136, optical imaging sensors 144, etc., and/or remote devices, e.g., the image transfer device 120.

In various embodiments, computing device 600 may have more or less elements and/or different architectures.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method comprising:
processing a source image file to provide a dithered image file having print data, wherein the dithered image file indicates that (i) printing substance is to be deposited by a nozzle of a printing device over a first location of a medium and (ii) printing substance is not to be deposited by the nozzle of the printing device over a second location of the medium, wherein the first location of the medium and the second location of the medium are proximally located locations of the medium; and during a swipe of the printing device over the medium,
determining that the nozzle (i) is likely to pass over the second location of the medium and (ii) not likely to pass over the first location of the medium,
determining that depositing the printing substance over the second location of the medium, instead of over the first location of the medium, does not substantially affect a quality of the image, and
based on (i) determining that the nozzle is likely to pass over the second location of the medium and not likely to pass over the first location of the medium and (ii) determining that depositing the printing substance over the second location of the medium does not substantially affect a quality of the image, depositing the printing substance by the nozzle of the printing device over the second location of the medium, instead of over the first location of the medium.

2. The method of claim 1, further comprising:
based on (i) determining that the nozzle is likely to pass over the second location of the medium and not likely to pass over the first location of the medium and (ii) determining that depositing the printing substance over the second location of the medium does not substantially affect a quality of the image, updating the dithered image file having print data to generate an updated dithered image file having print data, wherein the updated dithered image file indicates that (i) printing substance is to be deposited by the nozzle of the printing device over the second location of the medium and (ii) printing substance is not to be deposited by the nozzle of the printing device over the first location of the medium.

3. The method of claim 2, wherein depositing the printing substance over the second location of the medium further comprises:
based on the updated dithered image file, depositing the printing substance by the nozzle of the printing device over the second location of the medium, instead of over the first location of the medium.

4. The method of claim 1, wherein the swipe of the printing device is a first swipe of the printing device over the medium, wherein a plurality of swipes of the printing device over the medium comprises (i) the first swipe of the printing device over the medium and (ii) one or more other swipes, prior to the first swipe, of the printing device over the medium, and wherein the method further comprises:
during the plurality of swipes of the printing device over the medium,
based on the dithered image file, depositing printing substance over one or more locations of the medium, wherein the one or more locations excludes the first location and the second location, and receiving feedback data related to deposition of the printing substance over the one or more locations of the medium.

5. The method of claim 4, wherein depositing the printing substance over the second location of the medium further comprises:
based on receiving the feedback data related to deposition of the printing substance over the one or more locations of the medium, depositing the printing substance by the nozzle of the printing device over the second location of the medium, instead of over the first location of the medium.

6. The method of claim 1, further comprising:
while the printing device is swiped over the medium, capturing surface images of the medium.

7. The method of claim 6, wherein determining that the nozzle (i) is likely to pass over the second location of the medium and (ii) not likely to pass over the first location of the medium further comprises:
based on the captured surface images of the medium, determining that the nozzle (i) is likely to pass over the second location of the medium and (ii) not likely to pass over the first location of the medium.

8. The method of claim 1, wherein:
(i) the first location of the medium and (ii) the second location of the medium are respectively associated with (i) a first image location in the dithered image file and (ii) a second image location in the dithered image file; and
each of the first image location in the dithered image file and the second image location in the dithered image file are associated with a single image location in the source image file.

9. The method of claim 8, wherein:
based on an intensity level of the single image location in the source image file, the dithered image file indicates that (i) printing substance is to be deposited by the nozzle of the printing device over the first location of a medium and (ii) printing substance is not to be deposited by the nozzle of the printing device over the second location of the medium.

10. A printing device comprising:
an image processing module configured to
process a source image file to provide a dithered image file having print data, wherein the dithered image file indicates that (i) printing substance is to be deposited by a nozzle of a printing device over a first location of a medium and (ii) printing substance is not to be deposited by the nozzle of the printing device over a second location of the medium, wherein the first location of the medium and the second location of the medium are proximally located locations of the medium,
during a swipe of the printing device over the medium,
determine that the nozzle (i) is likely to pass over the second location of the medium and (ii) not likely to pass over the first location of the medium, and
determine that depositing the printing substance over the second location of the medium, instead of over the first location of the medium, does not substantially affect a quality of the image; and
a print module configured to
based on the image processing module (i) determining that the nozzle is likely to pass over the second location of the medium and not likely to pass over the first location of the medium and (ii) determining that depositing the printing substance over the second location of the medium does not substantially affect a quality of the image, cause the nozzle to deposit the printing substance over the second location of the medium, instead of over the first location of the medium.

11. The printing device of claim 10, wherein the image processing module is further configured to:
based on (i) determining that the nozzle is likely to pass over the second location of the medium and not likely to pass over the first location of the medium and (ii) determining that depositing the printing substance over the second location of the medium does not substantially affect a quality of the image, update the dithered image file having print data to generate an updated dithered image file having print data, wherein the updated dithered image file indicates that (i) printing substance is to be deposited by the nozzle of the printing device over the second location of the medium and (ii) printing substance is not to be deposited by the nozzle of the printing device over the first location of the medium.

12. The printing device of claim 11, wherein the print module is further configured to, based on the updated dithered image file, cause the nozzle to deposit the printing substance over the second location of the medium, instead of over the first location of the medium.

13. The printing device of claim 10, wherein the swipe of the printing device is a first swipe of the printing device over the medium, wherein a plurality of swipes of the printing device over the medium comprises (i) the first swipe of the printing device over the medium and (ii) one or more other swipes, prior to the first swipe, of the printing device over the medium, and wherein:
the print module is further configured to
during the plurality of swipes of the printing device over the medium, based on the dithered image file, cause the nozzle to deposit the printing substance over one or more locations of the medium, wherein the one or more locations excludes the first location and the second location; and
the image processing module is further configured to
receive feedback data related to deposition of the printing substance over the one or more locations of the medium.

14. The printing device of claim 13, wherein the print module is configured to, based on receiving the feedback data related to deposition of the printing substance over the one or more locations of the medium, cause the nozzle to deposit the printing substance over the second location of the medium, instead of over the first location of the medium.

15. The printing device of claim 10, further comprising:
a sensor configured to, while the printing device is swiped over the medium, capture surface images of the medium.

16. The printing device of claim 15, wherein the image processing module is configured to, based on the sensor capturing the surface images of the medium, determine that the nozzle (i) is likely to pass over the second location of the medium and (ii) not likely to pass over the first location of the medium.

17. The printing device of claim 10, wherein:
the first location of the medium and the second location of the medium are respectively associated with (i) a first image location in the dithered image file and (ii) a second image location in the dithered image file; and
each of the first image location in the dithered image file and the second image location in the dithered image file are associated with a single image location in the source image file.

18. The printing device of claim 17, wherein:

based on an intensity level of the single image location in the source image file, the dithered image file indicates that (i) printing substance is to be deposited by the nozzle of the printing device over the first location of a medium and (ii) printing substance is not to be deposited by the nozzle of the printing device over the second location of the medium.

\* \* \* \* \*